(12) United States Patent
Chen et al.

(10) Patent No.: US 11,198,225 B2
(45) Date of Patent: Dec. 14, 2021

(54) MULTI-AXIS ROBOTIC ARM

(71) Applicant: Cheng Uei Precision Industry Co., LTD., New Taipei (TW)

(72) Inventors: Ming-Tsung Chen, New Taipei (TW); Jun-Wei Huang, New Taipei (TW); Pei-Fen Wu, New Taipei (TW); Jung-Kuang Liu, New Taipei (TW); Kun-Cheng Li, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/987,360

(22) Filed: Aug. 6, 2020

(65) Prior Publication Data

US 2021/0138666 A1    May 13, 2021

(30) Foreign Application Priority Data

Nov. 13, 2019   (CN) .......................... 201921951147.3

(51) Int. Cl.
  *B25J 9/08*   (2006.01)
  *B25J 17/02*  (2006.01)

(52) U.S. Cl.
  CPC .................................. *B25J 17/025* (2013.01)

(58) Field of Classification Search
  CPC ... B25J 17/025; B25J 18/00; B25J 9/08; B25J 17/00; B25J 17/0241; B25J 18/002; B25J 18/005; B25J 18/007; B25J 18/02; B25J 18/025; B25J 18/06; B25J 9/1625; B25J 9/065
  See application file for complete search history.

(56) References Cited

U.S. PATENT DOCUMENTS

| | | | | |
|---|---|---|---|---|
| 6,892,465 | B2* | 5/2005 | Raab | B23Q 35/04 33/503 |
| 10,625,414 | B2* | 4/2020 | Haddadin | B25J 17/00 |
| 10,933,540 | B2* | 3/2021 | Nakayama | B25J 9/0009 |
| 2013/0255429 | A1* | 10/2013 | Hahakura | B25J 17/00 74/490.05 |
| 2014/0338490 | A1* | 11/2014 | Shinabe | B25J 9/0009 74/490.03 |
| 2017/0100844 | A1* | 4/2017 | Raak | B25J 9/08 |
| 2018/0186017 | A1* | 7/2018 | Xiong | B25J 17/00 |
| 2019/0134811 | A1* | 5/2019 | Haddadin | B25J 9/0009 |

(Continued)

*Primary Examiner* — Jake Cook
*Assistant Examiner* — Gregory Robert Weber
(74) *Attorney, Agent, or Firm* — Cheng-Ju Chiang

(57) ABSTRACT

A multi-axis robotic arm includes a pedestal, a plurality of knuckle module and at least one detachable arm module. One of the plurality of the knuckle modules is connected with the pedestal. Two knuckle modules are connected to a first connecting element and a second connecting element. The first connecting element has a first docking portion, and the second connecting element has a second docking portion. The first docking portion and the second docking portion are detachably docked with each other by a plurality of fasteners. The at least one arm module have a third docking portion and a fourth docking portion. The third docking portion is detachably docked with the first docking portion by the plurality of the fasteners. The fourth docking portion is detachably docked with the second docking portion by the plurality of the fasteners.

19 Claims, 5 Drawing Sheets

(56) References Cited

U.S. PATENT DOCUMENTS

2020/0055181 A1\* 2/2020 Caron L'Ecuyer .... B25J 17/025
2020/0338728 A1\* 10/2020 Toothaker .............. B25J 9/1633
2020/0391393 A1\* 12/2020 Johansen ................. B25J 17/00

\* cited by examiner

MULTI-AXIS ROBOTIC ARM

CROSS-REFERENCE TO RELATED APPLICATION

The present application is based on, and claims priority from, China Patent Application No. 201921951147.3, filed Nov. 13, 2019, the disclosure of which is hereby incorporated by reference herein in its entirety.

BACKGROUND OF THE INVENTION

1. Field of the Invention

The present invention generally relates to a robotic arm, and more particularly to a multi-axis robotic arm.

2. The Related Art

With the increasingly rapid development of science and technology, a conventional multi-axis robotic arm is more and more used in industrial productions. Currently, the conventional multi-axis robotic arm generally includes a plurality of knuckle modules, and an arm module fixed to and connected between two knuckle modules. The arm module is disposed between the two knuckle modules. However, because the current arm module is difficult to be disassembled, the multi-axis robotic arm can only be used with its inherent structure. It is impossible to appropriate for different use requirements by disassembling or replacing different arm modules, thereby a use of the multi-axis robotic arm is seriously restricted that makes the multi-axis robotic arm just be used in quite circumscribed specific situations.

SUMMARY OF THE INVENTION

An object of the present invention is to provide a multi-axis robotic arm. The multi-axis robotic arm includes a pedestal; a plurality of knuckle module and at least one detachable arm module. One of the plurality of the knuckle modules is connected with the pedestal. Two adjacent ends of two knuckle modules are connected to a first connecting element and a second connecting element. The first connecting element has a first docking portion, and the second connecting element has a second docking portion corresponding to the first docking portion. The first docking portion and the second docking portion are detachably matched with and docked with each other by a plurality of fasteners. Two opposite ends of the at least one arm module have a third docking portion and a fourth docking portion. The third docking portion is detachably matched with and docked with the first docking portion by the plurality of the fasteners. The fourth docking portion is detachably matched with and docked with the second docking portion by the plurality of the fasteners.

Another object of the present invention is to provide a multi-axis robotic arm. The multi-axis robotic arm includes a pedestal, a plurality of knuckle modules, two arm modules, two first connecting elements and two second connecting elements. One of the knuckle modules is connected with the pedestal. The plurality of the knuckle modules include a first knuckle module, a second knuckle module, a third knuckle module, a fourth knuckle module, a fifth knuckle module and a sixth knuckle module arranged along an upward direction. The knuckle module closest to the pedestal is defined as the first knuckle module. The second knuckle module is connected with the first knuckle module. The third knuckle module is located above the second knuckle module. The fourth knuckle module is located above the third knuckle module. The fifth knuckle module is connected with the fourth knuckle module and is located above the third knuckle module, and the sixth knuckle module is furthest to the pedestal, and the sixth knuckle module is located above and is connected with the fifth knuckle module. One arm module is connected between the second knuckle module and the third knuckle module. The other arm module is connected between the third knuckle module and the fourth knuckle module. One end of the second knuckle module facing the third knuckle module are connected with one first connecting element. One side of the third knuckle module is fixed with and connected with an elbow, and the third knuckle module is fixed with and connected with the other first connecting element through the elbow. One end of the third knuckle module facing the second knuckle module is connected with one second connecting element. The one arm module is connected between the one first connecting element and the one second connecting element, and the one arm module, the one first connecting element and the one second connecting element are located and fastened between the second knuckle module and the third knuckle module. One end of the fourth knuckle module facing the other first connecting element is connected with the other second connecting element. The other arm module is connected between the other first connecting element and the other second connecting element. The one arm module is detachable matched with and docked with the one first connecting element and the one second connecting element by a plurality of fasteners, the other arm module is detachable matched with and docked with the other first connecting element and the other second connecting element by the plurality of the fasteners.

Another object of the present invention is to provide a multi-axis robotic arm. The multi-axis robotic arm includes a pedestal, a plurality of knuckle modules, two first connecting elements and two second connecting elements. One of the knuckle modules is connected with the pedestal. The plurality of the knuckle modules include a first knuckle module, a second knuckle module, a third knuckle module, a fourth knuckle module, a fifth knuckle module and a sixth knuckle module arranged along an upward direction. The knuckle module closest to the pedestal is defined as the first knuckle module. The second knuckle module is connected with the first knuckle module. The third knuckle module is located above the second knuckle module. The fourth knuckle module is located above the third knuckle module. The fifth knuckle module is connected with the fourth knuckle module and is located above the third knuckle module, and the sixth knuckle module is furthest to the pedestal, and the sixth knuckle module is located above and is connected with the fifth knuckle module. One end of the second knuckle module facing the third knuckle module are connected with one first connecting element. One side of the third knuckle module is fixed with and connected with an elbow, and the third knuckle module is fixed with and connected with the other first connecting element through the elbow. One end of the third knuckle module facing the second knuckle module is connected with one second connecting element. The one first connecting element and the one second connecting element are located and fastened between the second knuckle module and the third knuckle module. One end of the fourth knuckle module facing the other first connecting element is connected with the other second connecting element. Each first connecting element is detachable matched with and docked with one of the two second connecting elements by a plurality of fasteners.

As described above, the at least one detachable arm module of the multi-axis robotic arm is a two-piece structure, the first half structure and the second half structure are firmly combined into one body to simultaneously reinforce the first half structure and the second half structure, so the multi-axis robotic arm is easily detachable to be used in various situations and satisfy usage requirements.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
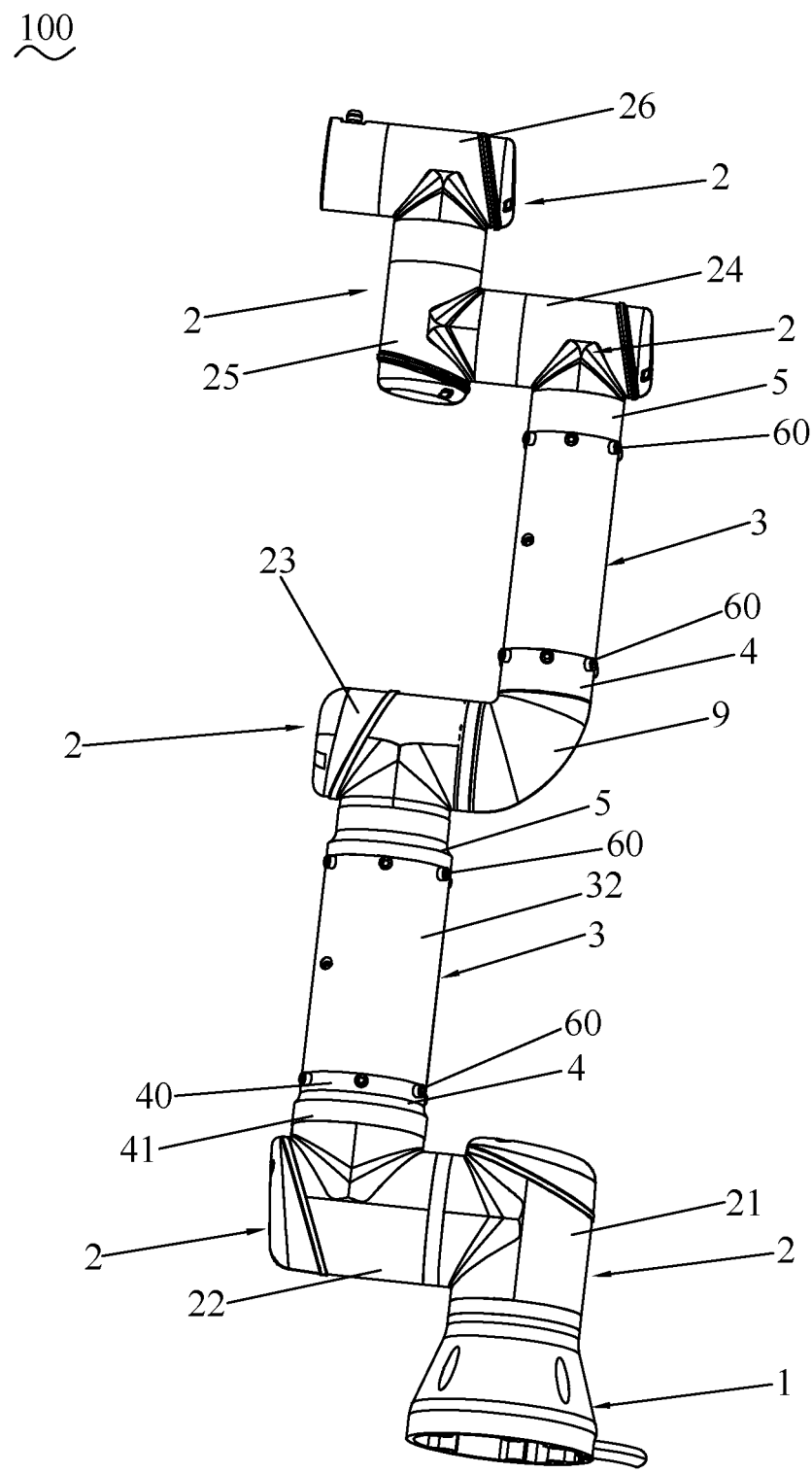
FIG. 1 is a perspective view of a multi-axis robotic arm equipped with two detachable arm modules in accordance with the present invention.

With reference to FIG. 1 to FIG. 5, a multi-axis robotic arm 100 in accordance with the present invention is shown. The multi-axis robotic arm 100 includes a pedestal 1, a plurality of knuckle modules 2, at least one detachable arm module 3, a first connecting element 4 and a second connecting element 5. One of the plurality of the knuckle modules 2 is connected with the pedestal 1.

Two adjacent ends of two knuckle modules 2 are connected to the first connecting element 4 and the second connecting element 5, respectively. The one of the plurality of the knuckle modules 2 connected with the pedestal 1 is connected with another knuckle module 2 adjacent to the one of the plurality of the knuckle modules 2. The first connecting element 4 has a first docking portion 40, and the second connecting element 5 has a second docking portion 50. The first connecting element 4 is of an inverted-T shape from a front view. The first connecting element 4 has a first base portion 41. A shape of a top of the first base portion 41 is cylindrical. A periphery of a middle of the top of the first base portion 41 protrudes upward to form the ring-shaped first docking portion 40. The second connecting element 5 has a second base portion 51. A shape of a bottom of the second base portion 51 is cylindrical. A middle of the bottom of the second base portion 51 protrudes downward to form the cylindrical second docking portion 50. The second docking portion 50 is corresponding to the first docking portion 40.

The first docking portion 40 of the first connecting element 4 and the second docking portion 50 of the second connecting element 5 are detachably matched with and docked with each other by a plurality of fasteners 60. Two opposite ends of the at least one arm module 3 have a third docking portion 30 and a fourth docking portion 31. The third docking portion 30 is detachably matched with and docked with the first docking portion 40 by the plurality of the fasteners 60. The fourth docking portion 31 is detachably matched with and docked with the second docking portion 50 by the plurality of the fasteners 60.

Corresponding knuckle modules 2 are connected into a whole part by virtue of the first docking portion 40 of the first connecting element 4 being matched with and docked with the second docking portion 50 of the second connecting element 5 of the multi-axis robotic arm 100. The first connecting element 4 is detached from the second connecting element 5 by virtue of detaching the plurality of the fasteners 60 between the first docking portion 40 and the second docking portion 50 to make the first connecting element 4 separated from the second connecting element 5, and then the at least one detachable arm module 3 is assembled between the first connecting element 4 and the second connecting element 5. The third docking portion 30 of the at least one detachable arm module 3 is matched with and docked with the first docking portion 40 of the first connecting element 4. The third docking portion 30 of the at least one detachable arm module 3 is fastened with the first docking portion 40 of the first connecting element 4 by the plurality of the fasteners 60. The fourth docking portion 31 of the at least one detachable arm module 3 is matched with and docked with the second docking portion 50 of the second connecting element 5. The fourth docking portion 31 of the at least one detachable arm module 3 is fastened with the second docking portion 50 of the second connecting element 5 by virtue of the plurality of the fasteners 60. So that a detachable assembly of the at least one detachable arm module 3 is realized.

According to differences of usage requirements, the at least one detachable arm module 3 is changed among different arm modules 3. According to the differences of the usage requirements of the multi-axis robotic arm 100, the multi-axis robotic arm 100 is used after the corresponding arm module 3 is chosen to be detached, and the different arm modules 3 are also chosen to be assembled to be applied to the various usage requirements, so a usage scope of the multi-axis robotic arm 100 is greatly improved. In addition, according to the differences and requirements of the multi-axis robotic arm 100, one first connecting element 4 and one second connecting element 5 are just disposed between a group of the knuckle modules 2 for selectively being connected with the arm module 3. Preferably, the multi-axis robotic arm 100 includes a plurality of the first connecting elements 4 and the second connecting elements 5 disposed among two groups of the knuckle modules 2 or more than the two groups of the knuckle modules 2, so that multiple usage combinations are proceeded to appropriate for being applied to more usage occasions.

With reference to FIG. 1 to FIG. 5, in some preferred embodiments, the first docking portion 40 is a loop structure, and the second docking portion 50 is a nested structure, in assembly, the first docking portion 40 is sleeved outside the second docking portion 50. The at least one arm module 3 includes a tube body 32. The third docking portion 30 is the nested structure and is formed at one end of the tube body 32. The fourth docking portion 31 is the loop structure and is formed at the other end of the tube body 32. In assembly, the third docking portion 30 is nested within the first docking portion 40, and the fourth docking portion 31 is sleeved outside the second docking portion 50.

The first docking portion 40 and the second docking portion 50 are steadily matched with and connected with each other, the first docking portion 40 and the third docking portion 30 are steadily matched with and connected with each other, and the second docking portion 50 and the fourth docking portion 31 are steadily matched with and connected with each other by designs of the loop structures of the first docking portion 40 and the fourth docking portion 31 and the nested structures of the second docking portion 50 and the third docking portion 30. Specifically, the tube body 32 is a regular tube shape, usually a cylindrical tube shape. The fourth docking portion 31 is acted as the one end of the tube body 32, and is without being limited to be acted as the one end of the tube body 32. The first docking portion 40, the second docking portion 50, the third docking portion 30 and the fourth docking portion 31 are without being limited to the above-mentioned loop structures and nested structures.

Preferably, the second connecting element 5 has the second base portion 51. The second docking portion 50 is protruded downward from the bottom of the second base portion 51. An outer periphery surface of the second docking portion 50 has an annular attaching surface 52. When the first docking portion 40 is sleeved outside the second docking portion 50, the annular attaching surface 52 is attached to an inner periphery surface of the first docking portion 40. An inner surface of one end of the tube body 32 is connected with the third docking portion 30, and the third docking portion 30 is annular and is extended axially downward from the inner surface of the one end of the tube body 32.

When the third docking portion 30 is nested in the first docking portion 40, a lower end surface of the tube body 32 is in contact with and abuts against a top end surface of the first docking portion 40. When the fourth docking portion 31 is sleeved outside the second docking portion 50, a top end surface of the fourth docking portion 31 abuts against a periphery of a bottom surface of the second base portion 51, and the annular attaching surface 52 is attached to an inner surface of a free end of the fourth docking portion 31. Regardless of the first connecting element 4 and the second connecting element 5 being connected by at least one knuckle module 2 or the first connecting element 4 and the second connecting element 5 being directly connected, the at least one detachable arm module 3, the first connecting element 4 and the second connecting element 5 are realized to be assembled more steadily by above-mentioned designs of the at least one detachable arm module 3, the first connecting element 4 and the second connecting element 5. Specifically, the second docking portion 50 is shown as a circular convex plate shape, and the second docking portion 50 is without being limited to the circular convex plate shape.

Preferably, comparing with the knuckle module 2 connected with the second connecting element 5, the knuckle module 2 connected with the first connecting element 4 is closer to the pedestal 1, namely a distance between the knuckle module 2 connected with the first connecting element 4 and the pedestal 1 is smaller than a distance between the knuckle module 2 connected with the second connecting element 5 and the pedestal 1. A distance design among the pedestal 1, the knuckle module 2, the first connecting element 4 and the second connecting element 5 is more beneficial to a reliability of the overall structure of the multi-axis robotic arm 100.

Figure 3:
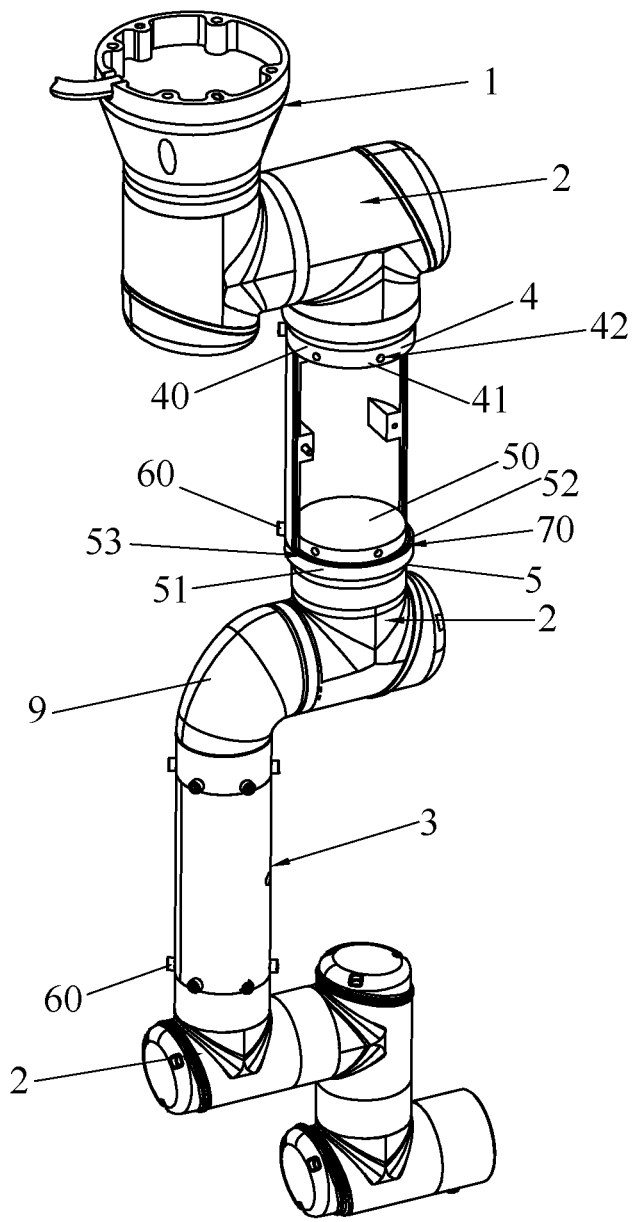
FIG. 3 is another perspective view of the multi-axis robotic arm of FIG. 2.
Figure 4:
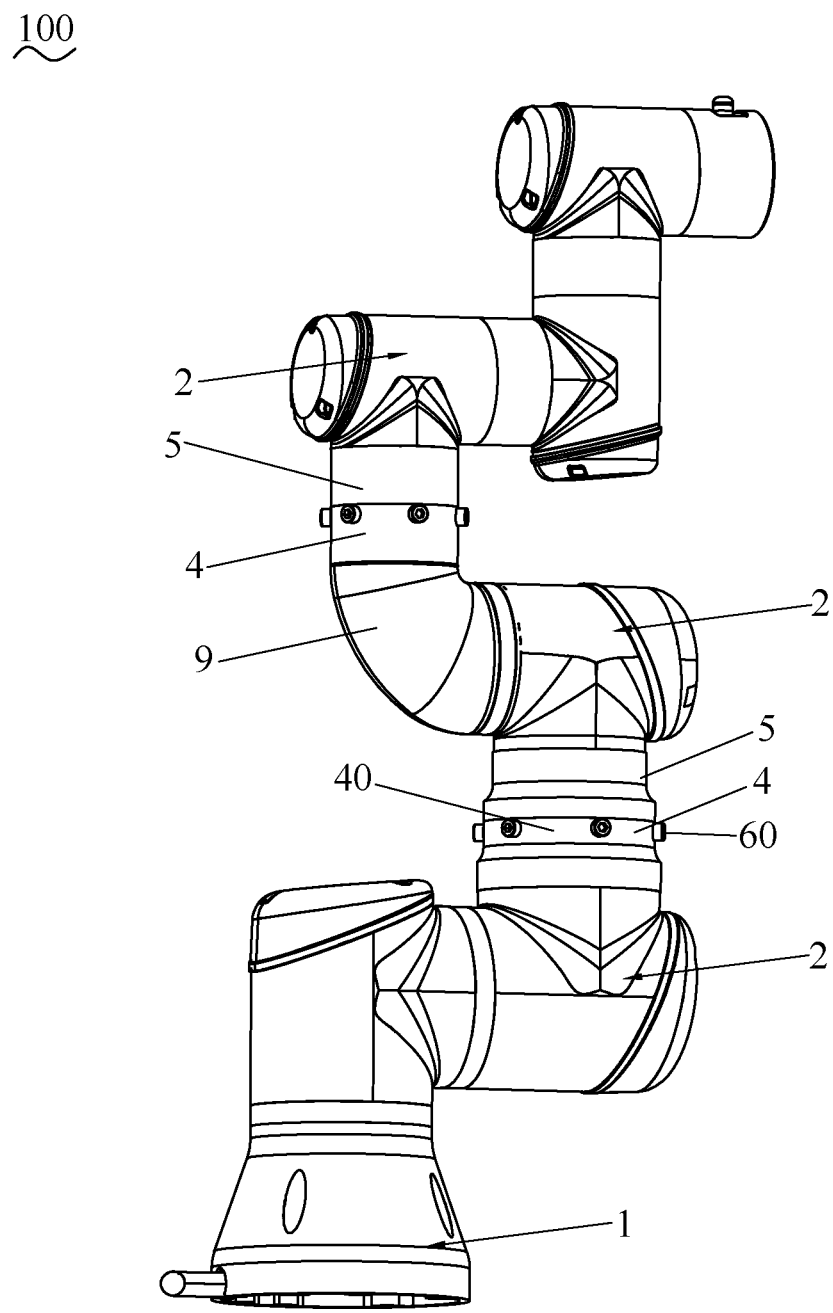
FIG. 4 is a perspective view of the multi-axis robotic arm which is without being equipped with the two detachable arm modules in accordance with the present invention.
Figure 5:
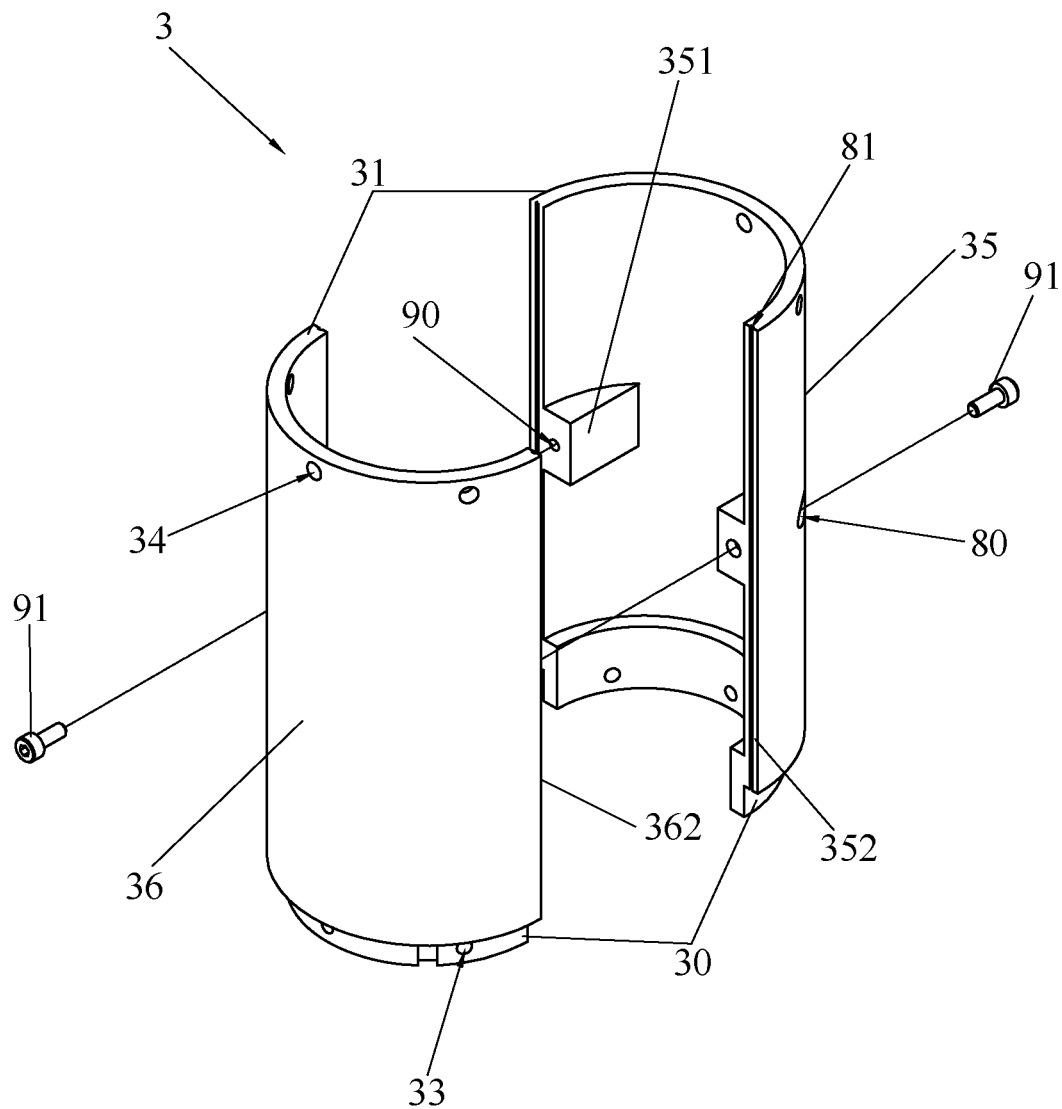
FIG. 5 is an exploded view of the detachable arm module of the multi-axis robotic arm in accordance with the present invention.

With reference to FIG. 3 and FIG. 5, preferably, a periphery of the first docking portion 40 is distributed with a plurality of first through holes 42. A periphery of the second docking portion 50 is distributed with a plurality of first screw holes 53. Each fastener 60 is a screw. When the first docking portion 40 is sleeved around the outer periphery surface of the second docking portion 50, the plurality of the first through holes 42 are corresponding to the plurality of the first screw holes 53, the plurality of the fasteners 60 pass through the plurality of the first through holes 42, and the plurality of the fasteners 60 are screwed to and connected to the plurality of the first screw holes 53, so that the first docking portion 40 is fastened with the second docking portion 50.

A periphery of the third docking portion 30 is distributed with a plurality of second screw holes 33. When the third docking portion 30 is nested in the first docking portion 40, the plurality of the first through holes 42 are corresponding to the plurality of the second screw holes 33, the plurality of the fasteners 60 pass through the plurality of the first through holes 42, and the plurality of the fasteners 60 are screwed to and connected to the plurality of the second screw holes 33, so that the first docking portion 40 is fastened with the third docking portion 30.

A periphery of the fourth docking portion 31 is distributed with a plurality of second through holes 34. When the fourth docking portion 31 is sleeved around the outer periphery surface of the second docking portion 50, the plurality of the second through holes 34 are corresponding to the plurality of the first screw holes 53, the plurality of the fasteners 60 pass through the plurality of the second through holes 34, and the plurality of the fasteners 60 are screwed to and connected to the plurality of the first screw holes 53, so that the second docking portion 50 is fastened with the fourth docking portion 31. The first connecting element 4 and the second connecting element 5 are steadily connected with each other by the aforesaid designs of the first connecting element 4 and the second connecting element 5, or the at least one knuckle module 2 is steadily fastened and connected between the first connecting element 4 and the second connecting element 5 by the aforesaid designs of the at least one knuckle module 2, the first connecting element 4 and the second connecting element 5, simultaneously, the aforesaid designs of the at least one knuckle module 2, the first connecting element 4 and the second connecting element 5 bring conveniences for the at least one knuckle module 2, the first connecting element 4 and the second connecting element 5 to be quickly assembled and detached. It should be noted that a peripheral direction of each of the first docking portion 40, the second docking portion 50, the third docking portion 30 and the fourth docking portion 31 is without being directed to a circular direction. When a shape of the first docking portion 40, the second docking portion 50, the third docking portion 30 or the fourth docking portion 31 is without being shown as a cylinder shape or a circular tube shape, the peripheral direction of each of the first docking portion 40, the second docking portion 50, the third docking portion 30 and the fourth docking portion 31 is directed to an outer periphery direction along an outside of each of the first docking portion 40, the second docking portion 50, the third docking portion 30 and the fourth docking portion 31.

Figure 2:
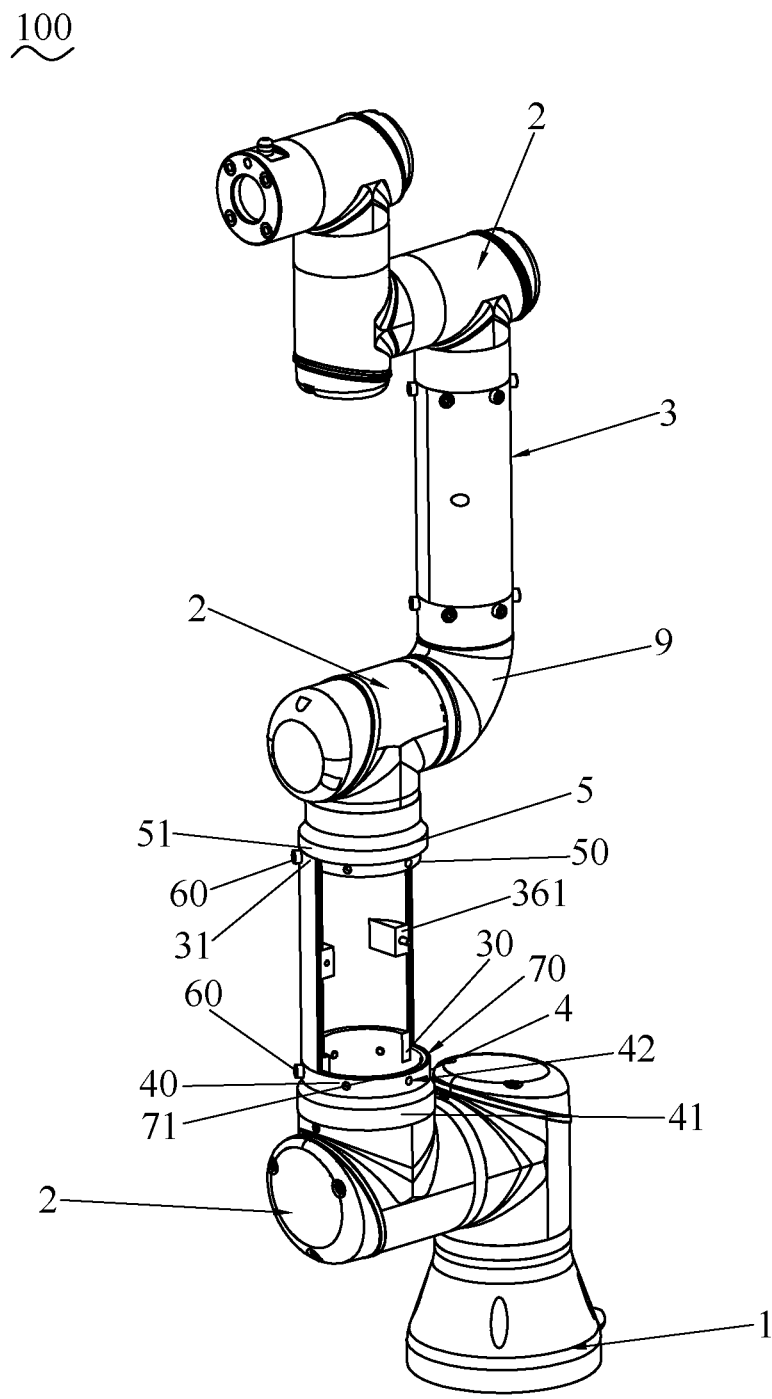
FIG. 2 is a perspective view of the multi-axis robotic arm hiding a partial structure of the multi-axis robotic arm of FIG. 1.

With reference to FIG. 2 and FIG. 3, preferably, at least one of the annular attaching surface 52 and the inner periphery surface of the first docking portion 40 connecting with the annular attaching surface 52, defines a sealing slot 70 for accommodating a sealing ring 71, at least one of the annular attaching surface 52 and an inner periphery surface of the fourth docking portion 31 connecting with the annular attaching surface 52, defines the sealing slot 70 for accommodating the sealing ring 71, and at least one of the inner periphery surface of the first docking portion 40 and an outer periphery surface of the third docking portion 30 defines the sealing slot 70 for accommodating the sealing ring 71. The knuckle module 2 is sealed and connected between the first connecting element 4 and the second connecting element 5 or the first connecting element 4 and the second connecting element 5 are directly sealed and connected by the aforesaid designs of the sealing slot 70 and the sealing ring 71. Specifically, the annular attaching surface 52 and the inner periphery surface of the first docking portion 40 are recessed inward to from two sealing slots 70 for accommodating two sealing rings 71, respectively, so it is unnecessary to provide the sealing slot 70 defined in the third docking portion 30 and the fourth docking portion 31 of each arm module 3.

With reference to FIG. 1 to FIG. 5, in some preferred embodiments, the at least one arm module 3 is a two-piece structure, and the at least one arm module 3 includes a first half structure 35 and a second half structure 36. The first half structure 35 and the second half structure 36 are spliced with each other to form the tube body 32, the third docking portion 30 and the fourth docking portion 31.

Preferably, the first half structure 35 and the second half structure 36 have a first block 351 and a second block 361 protruded inward from an inner periphery surface of the tube body 32, respectively. The first block 351 is disposed opposite to the second block 361. The first block 351 is corresponding to and combined with the second block 361. One of the first block 351 and the second block 361 defines an aperture 80. The other one of the first block 351 and the second block 361 defines a thread hole 90 corresponding to the aperture 80. The multi-axis robotic arm 100 further includes two bolts 91. The two bolts 91 pass through the apertures 80 of the first half structure 35 and the second half structure 36, and the two bolts 91 are connected and are screwed to the thread holes 90 of the first half structure 35 and the second half structure 36 to fix the first half structure 35 with the second half structure 36, so that the first half structure 35 and the second half structure 36 are firmly combined into one body to simultaneously reinforce the first half structure 35 and the second half structure 36.

Preferably, the first half structure 35 and the second half structure 36 have at least two first blocks 351 and at least two second blocks 361 protruded inward from the inner periphery surface of the tube body 32, respectively. A quantity of the at least two first blocks 351 is an even number, and a quantity of the at least two second blocks 361 is the even number. The at least two first blocks 351 and the at least two second blocks 361 define at least two groups of the apertures 80 and the threaded holes 90 corresponding to the apertures 80. The multi-axis robotic arm 100 further includes at least two bolts 91. The at least two bolts 91 pass through the at least two groups of the apertures 80 and the threaded holes 90 to fix the first half structure 35 with the second half structure 36.

Specifically, the first half structure 35 and the second half structure 36 have two first blocks 351 and two second blocks 361 protruded inward from the inner periphery surface of the tube body 32, respectively. The first blocks 351 are formed on two opposite sides of the inner periphery surface of the tube body 32. The first blocks 351 are formed on two opposite sides of an inner surface of the first half structure 35. One first block 351 defines one aperture 80, and the other first block 351 defines one threaded hole 90. The second blocks 361 are formed on two opposite sides of the inner periphery surface of the tube body 32. The second blocks 361 are formed on two opposite sides of an inner surface of the second half structure 36. One second block 361 defines the other threaded hole 90, and the other second block 361 defines the other aperture 80.

The two first blocks 351 are corresponding to and combined with the two second blocks 361. The one aperture 80 of the one first block 351 is corresponding to the other threaded hole 90 of the one second block 361. The one threaded hole 90 of the other first block 351 is corresponding to the other aperture 8 of the other second block 361. The first half structure 35 and the second half structure 36 are realized to be firmly combined by a cooperation of the at least two groups of the apertures 80 and the threaded holes 90 corresponding to the apertures 80, and the at least two bolts 91, and simultaneously, the aforesaid structure designs of the first half structure 35 and the second half structure 36 are beneficial for each of the first half structure 35 and the second half structure 36 to be designed in the same structure to reduce a cost of opening a mold for molding each of the first half structure 35 and the second half structure 36.

Two opposite side surfaces of the first half structure 35 are defined as two first adhering surfaces 352. Two opposite side surfaces of the second half structure 36 are defined as two second adhering surfaces 362 facing the two first adhering surfaces 352. Preferably, at least one of the two first adhering surfaces 352 of the first half structure 35 and the two second adhering surfaces 362 of the second half structure 36 has a receiving groove 81 for receiving a waterproof glue (not shown) so as to be beneficial for the at least one arm module 3 to be sealed and assembled.

Specifically, the two first adhering surfaces 352 of the first half structure 35 and the two second adhering surfaces 362 of the second half structure 36 have a plurality of the receiving grooves 81, designs of the plurality of the receiving grooves 81 provide a convenience for each of the first half structure 35 and the second half structure 36 to be designed as the same structure.

In some preferred embodiments, the at least one detachable arm module 3 is made of aluminum alloy material, and is without being limited to be made of the aluminum alloy material.

With reference to FIG. 1, in the preferred specific embodiment, the multi-axis robotic arm 100 is a six-axis robotic arm. The multi-axis robotic arm 100 which is the six-axis robotic arm is capable of being connected with two detachable arm modules 3.

Specifically, the plurality of the knuckle modules 2 include a first knuckle module 21, a second knuckle module 22, a third knuckle module 23, a fourth knuckle module 24, a fifth knuckle module 25 and a sixth knuckle module 26 arranged along an upward direction. The knuckle module 2 closest to the pedestal 1 is defined as the first knuckle module 21, the second knuckle module 22 is connected with the first knuckle module 21, the third knuckle module 23 is located above the second knuckle module 22, the fourth knuckle module 24 is located above the third knuckle module 23, the fifth knuckle module 25 is connected with the fourth knuckle module 24 and is located above the third knuckle module 23, and the sixth knuckle module 26 is furthest to the pedestal 1, and the sixth knuckle module 26 is located above and is connected with the fifth knuckle module 25.

The multi-axis robotic arm 100 includes two arm modules 3, two first connecting elements 4 and two second connecting elements 5. One arm module 3 is connected between the second knuckle module 22 and the third knuckle module 23. The second knuckle module 22 and the third knuckle module 23 are connected to one first connecting element 4 and one second connecting element 5, and the one first connecting element 4 and the one second connecting element 5 are connected with the one arm module 3. One end of the second knuckle module 22 facing the third knuckle module 23 is connected with the one first connecting element 4. One end of the third knuckle module 23 facing the second knuckle module 22 is connected with the one second connecting element 5. The one arm module 3 is connected between the one first connecting element 4 and the one second connecting element 5, and the one arm module 3, the one first connecting element 4 and the one second connecting element 5 are located and fastened between the second knuckle module 22 and the third knuckle module 23. Or the one first connecting element 4 and the one second connecting element 5 are directly connected without being connected with the one arm module 3.

The other arm module 3 is connected between the third knuckle module 23 and the fourth knuckle module 24. One side of the third knuckle module 23 is fixed with and connected with an elbow 9, and the third knuckle module 23 is fixed with and connected with the other first connecting element 4 through the elbow 9. Preferably, the elbow 9 is integrated with the other first connecting element 4, that is to say, the elbow 9 is a part of the other first connecting element 4. One end of the fourth knuckle module 24 facing the other first connecting element 4 is connected with the other second connecting element 5. The other arm module 3 is connected between the other first connecting element 4 and the other second connecting element 5. A radial dimension of the one arm module 3 between the second knuckle module 22 and the third knuckle module 23 is larger than a radial dimension of the other arm module 3 between the third knuckle module 23 and the fourth knuckle module 24. The one arm module 3 is detachable matched with and docked with the one first connecting element 4 and the one second connecting element 5 by the plurality of the fasteners 60, the other arm module 3 is detachable matched with and docked with the other first connecting element 4 and the other second connecting element 5 by the plurality of the fasteners 60. Or the other first connecting element 4 is connected with the other second connecting element 5 directly without being connected with the other arm module 3. Each first connecting element 4 is detachable matched with and docked with one of the two second connecting elements 5 by the plurality of the fasteners 60.

As described above, the at least one detachable arm module 3 of the multi-axis robotic arm 100 is the two-piece structure, the first half structure 35 and the second half structure 36 are firmly combined into the one body to simultaneously reinforce the first half structure 35 and the second half structure 36, so the multi-axis robotic arm 100 is easily detachable to be used in various situations and satisfy usage requirements.

The above-mentioned description is just the preferred embodiment of the present invention, a patent application scope of the present invention is without being limited to the preferred embodiment, so an equivalent change made according to the patent application scope of the present invention still belongs to the patent application scope of the present invention.

What is claimed is:

1. A multi-axis robotic arm, comprising:
  a pedestal;
  a plurality of knuckle modules, one of the plurality of the knuckle modules being connected with the pedestal, two adjacent ends of two knuckle modules being connected to a first connecting element and a second connecting element, the first connecting element having a first docking portion, and the second connecting element having a second docking portion corresponding to the first docking portion, the first docking portion of the first connecting element and the second docking portion of the second connecting element being detachably matched with and docked with each other by a plurality of fasteners; and
  at least one detachable arm module, two opposite ends of the at least one arm module having a third docking portion and a fourth docking portion, the third docking portion being detachably matched with and docked with the first docking portion by the plurality of the fasteners, the fourth docking portion being detachably matched with and docked with the second docking portion by the plurality of the fasteners;
  wherein a periphery of the first docking portion is distributed with a plurality of first through holes, a periphery of the second docking portion is distributed with a plurality of first screw holes, when the first docking portion is sleeved around the outer periphery surface of the second docking portion, the plurality of the first through holes are corresponding to the plurality of the first screw holes, the plurality of the fasteners pass through the plurality of the first through holes, and the plurality of the fasteners are screwed to and connected to the plurality of the first screw holes, so that the first docking portion is fastened with the second docking portion.

2. The multi-axis robotic arm as claimed in claim 1, wherein the first docking portion is a loop structure, and the second docking portion is a nested structure, the first docking portion is sleeved outside the second docking portion, the at least one arm module has a tube body, the third docking portion is a nested structure and is formed at one end of the tube body, the fourth docking portion is a loop structure and is formed at another end of the tube body, the third docking portion is nested within the first docking portion, and the fourth docking portion is sleeved outside the second docking portion.

3. The multi-axis robotic arm as claimed in claim 2, wherein the first connecting element has a first base portion, a periphery of a middle of a top of the first base portion protrudes upward to form the first docking portion which is ring-shaped, the second connecting element has a second base portion, a middle of a bottom of the second base portion protrudes downward to form the cylindrical second docking portion, the second docking portion is corresponding to the first docking portion.

4. The multi-axis robotic arm as claimed in claim 3, wherein an outer periphery surface of the second docking portion has an annular attaching surface, when the first docking portion is sleeved outside the second docking portion, the annular attaching surface is attached to an inner periphery surface of the first docking portion, an inner surface of the one end of the tube body is connected with the third docking portion, and the third docking portion is annular and is extended axially downward from the inner surface of the one end of the tube body, when the third docking portion is nested in the first docking portion, a lower end surface of the tube body is in contact with and abuts against a top end surface of the first docking portion, when the fourth docking portion is sleeved outside the second docking portion, a top end surface of the fourth docking portion abuts against a periphery of a bottom surface of the second base portion, and the annular attaching surface is attached to an inner surface of a free end of the fourth docking portion.

5. The multi-axis robotic arm as claimed in claim 4, wherein a distance between the knuckle module connected with the first connecting element and the pedestal is smaller than a distance between the knuckle module connected with the second connecting element and the pedestal.

6. The multi-axis robotic arm as claimed in claim 2, wherein the at least one arm module is a two-piece structure, and the at least one arm module includes a first half structure and a second half structure, the first half structure and the second half structure are spliced to form the tube body, the third docking portion and the fourth docking portion.

7. The multi-axis robotic arm as claimed in claim 6, wherein the first half structure and the second half structure have a first block and a second block protruded inward from an inner periphery surface of the tube body, respectively, the first half structure and the second half structure have at least two first blocks and at least two second blocks protruded inward from the inner periphery surface of the tube body, respectively, the at least two first blocks and the at least two second blocks define at least two groups of apertures and threaded holes corresponding to the apertures, the multi-axis robotic arm further includes at least two bolts, the at least two bolts pass through the at least two groups of the apertures and the threaded holes to fix the first half structure with the second half structure.

8. The multi-axis robotic arm as claimed in claim 6, wherein the first half structure and the second half structure have a first block and a second block protruded inward from an inner periphery surface of the tube body, respectively, the first block is disposed opposite to the second block, the first block is corresponding to and combined with the second block, one of the first block and the second block defines an aperture, the other one of the first block and the second block defines a thread hole corresponding to the aperture, the multi-axis robotic arm further includes two bolts, the two bolts pass through the apertures of the first half structure and the second half structure, and the two bolts are connected and are screwed to the thread holes of the first half structure and the second half structure to fix the first half structure with the second half structure.

9. The multi-axis robotic arm as claimed in claim 6, wherein two opposite side surfaces of the first half structure are defined as two first adhering surfaces, two opposite side surfaces of the second half structure are defined as two second adhering surfaces facing the two first adhering surfaces, at least one of the two first adhering surfaces of the first half structure and the two second adhering surfaces of the second half structure has a receiving groove for receiving a waterproof glue.

10. The multi-axis robotic arm as claimed in claim 1, wherein a periphery of the third docking portion is distributed with a plurality of second screw holes, when the third docking portion is nested in the first docking portion, the plurality of the first through holes are corresponding to the plurality of the second screw holes, the plurality of the fasteners pass through the plurality of the first through holes, and the plurality of the fasteners are screwed to and connected to the plurality of the second screw holes, so that the first docking portion is fastened with the third docking portion.

11. The multi-axis robotic arm as claimed in claim 1, wherein a periphery of the fourth docking portion is distributed with a plurality of second through holes, when the fourth docking portion is sleeved around the outer periphery surface of the second docking portion, the plurality of the second through holes are corresponding to the plurality of the first screw holes, the plurality of the fasteners pass through the plurality of the second through holes, and the plurality of the fasteners are screwed to and connected to the plurality of the first screw holes, so that the second docking portion is fastened with the fourth docking portion.

12. The multi-axis robotic arm as claimed in claim 1, wherein at least one of the annular attaching surface and the inner periphery surface of the first docking portion connecting with the annular attaching surface, defines a sealing slot for accommodating a sealing ring, at least one of the annular attaching surface and an inner periphery surface of the fourth docking portion connecting with the annular attaching surface, defines the sealing slot for accommodating the sealing ring.

13. The multi-axis robotic arm as claimed in claim 1, wherein at least one of the inner periphery surface of the first docking portion and an outer periphery surface of the third docking portion defines a sealing slot for accommodating a sealing ring.

14. The multi-axis robotic arm as claimed in claim 1, wherein the annular attaching surface and the inner periphery surface of the first docking portion are recessed inward to from two sealing slots for accommodating two sealing rings.

15. The multi-axis robotic arm as claimed in claim 1, wherein the multi-axis robotic arm is a six-axis robotic arm.

16. A multi-axis robotic arm, comprising:
a pedestal;
a plurality of knuckle modules, one of the knuckle modules being connected with the pedestal, the plurality of the knuckle modules including a first knuckle module, a second knuckle module, a third knuckle module, a fourth knuckle module, a fifth knuckle module and a sixth knuckle module arranged along an upward direction, the knuckle module closest to the pedestal being defined as the first knuckle module, the second knuckle module being connected with the first knuckle module, the third knuckle module being located above the second knuckle module, the fourth knuckle module being located above the third knuckle module, the fifth knuckle module being connected with the fourth knuckle module and being located above the third knuckle module, and the sixth knuckle module being furthest to the pedestal, and the sixth knuckle module being located above and being connected with the fifth knuckle module;
two arm modules, each of the two arm modules is two-piece structure which includes a first half structure and a second half structure, and the first and second half structures are spliced with each other to form a tube body, and one of the two arm modules being connected between the second knuckle module and the third knuckle module, the other of the two arm modules being connected between the third knuckle module and the fourth knuckle module;
two first connecting elements, each of the two first connecting elements having a first docking portion, one end of the second knuckle module facing the third knuckle module being connected with one of the two first connecting elements, one side of the third knuckle module being fixed with and connected with an elbow, and the third knuckle module being fixed with and connected with the other of the two first connecting elements through the elbow; and
two second connecting elements, each of the two second connecting elements having a second docking portion corresponding to the first docking portion, one end of the third knuckle module facing the second knuckle module being connected with one of the two second connecting elements, the one of the two arm modules being connected between the one of the two first connecting elements and the one of the two second connecting elements, the one of the two first connecting elements and the one of the two second connecting elements being located and fastened between the second knuckle module and the third knuckle module, one end of the fourth knuckle module facing the other of the two first connecting elements being connected with the other of the two second connecting elements, the other of the two arm modules being connected between the other of the two first connecting elements and the other of the two second connecting elements;

wherein a periphery of the first docking portion is distributed with a plurality of first through holes, a periphery of the second docking portion is distributed with a plurality of first screw holes, when the first docking portion is sleeved around the outer periphery surface of the second docking portion, the plurality of the first through holes are corresponding to the plurality of the first screw holes, a plurality of the fasteners pass through the plurality of the first through holes, and the plurality of the fasteners are screwed to and connected to the plurality of the first screw holes, so that the first docking portion is fastened with the second docking portion.

17. The multi-axis robotic arm as claimed in claim 16, wherein the elbow is integrated with the other of the two first connecting elements.

18. The multi-axis robotic arm as claimed in claim 16, wherein a radial dimension of the one of the two arm modules between the second knuckle module and the third knuckle module is larger than a radial dimension of the other of the two arm modules between the third knuckle module and the fourth knuckle module.

19. A multi-axis robotic arm, comprising:
a pedestal;
a plurality of knuckle modules, one of the knuckle modules being connected with the pedestal, the plurality of the knuckle modules including a first knuckle module, a second knuckle module, a third knuckle module, a fourth knuckle module, a fifth knuckle module and a sixth knuckle module arranged along an upward direction, the knuckle module closest to the pedestal being defined as the first knuckle module, the second knuckle module being connected with the first knuckle module, the third knuckle module being located above the second knuckle module, the fourth knuckle module being located above the third knuckle module, the fifth knuckle module being connected with the fourth knuckle module and being located above the third knuckle module, and the sixth knuckle module being furthest to the pedestal, and the sixth knuckle module being located above and being connected with the fifth knuckle module;

two first connecting elements, each of the two first connecting elements having a first docking portion, one end of the second knuckle module facing the third knuckle module being connected with one of the two first connecting elements, one side of the third knuckle module being fixed with and connected with an elbow, and the third knuckle module being fixed with and connected with the other of the two first connecting elements through the elbow; and two second connecting elements, each of the two second connecting elements having a second docking portion corresponding to the first docking portion, one end of the third knuckle module facing the second knuckle module being connected with one of the two second connecting elements, the one of the two first connecting elements and the one of the two second connecting elements being located and fastened between the second knuckle module and the third knuckle module, one end of the fourth knuckle module facing the other of the two first connecting elements being connected with the other of the two second connecting elements, each of the two first connecting elements being detachable matched with and docked with a selective one of the two second connecting elements by a plurality of fasteners;

wherein a periphery of the first docking portion is distributed with a plurality of first through holes, a periphery of the second docking portion is distributed with a plurality of first screw holes, when the first docking portion is sleeved around the outer periphery surface of the second docking portion, the plurality of the first through holes are corresponding to the plurality of the first screw holes, the plurality of the fasteners pass through the plurality of the first through holes, and the plurality of the fasteners are screwed to and connected to the plurality of the first screw holes, so that the first docking portion is fastened with the second docking portion.

* * * * *